United States Patent
Becker

(10) Patent No.: US 6,258,211 B1
(45) Date of Patent: Jul. 10, 2001

(54) METHOD FOR PRODUCING HIGH-TEMPERATURE RESISTANT TECHNICAL PAPER AND PAPER PRODUCED ACCORDING TO SAID METHOD

(75) Inventor: Uwe Becker, Bippen-Ohrte (DE)

(73) Assignee: Culimeta-Alfons Cuylits-Gesellschaft für Textilglas Technologie m.b.H. & Co. KG (DE)

( * ) Notice: Subject to any disclaimer, the term of this patent is extended or adjusted under 35 U.S.C. 154(b) by 0 days.

(21) Appl. No.: 09/380,369

(22) PCT Filed: Feb. 28, 1998

(86) PCT No.: PCT/EP98/01140

§ 371 Date: Aug. 31, 1999

§ 102(e) Date: Aug. 31, 1999

(87) PCT Pub. No.: WO98/40557

PCT Pub. Date: Sep. 17, 1998

(30) Foreign Application Priority Data

Mar. 7, 1997 (DE) .............................................. 197 09 288

(51) Int. Cl.$^7$ ................................................... D21H 13/38
(52) U.S. Cl. .......................... 162/152; 162/149; 162/156; 162/169
(58) Field of Search ..................................... 162/141, 145, 162/155, 149, 152, 156, 146, 164.1, 169, 166; 428/293.4, 325, 357, 630, 632.49; 65/576, 462, 438

(56) References Cited

U.S. PATENT DOCUMENTS

| | | | | |
|---|---|---|---|---|
| 3,300,372 | * | 1/1967 | Bauer | 162/145 |
| 3,682,667 | * | 8/1972 | Roberts et al. | 252/62 |
| 3,687,850 | * | 8/1972 | Gagin | 162/156 |
| 5,041,321 | * | 8/1991 | Bendig | 428/102 |
| 5,053,107 | * | 10/1991 | Barber, Jr. | 162/145 |
| 5,273,821 | * | 12/1993 | Olson et al. | 428/357 |

OTHER PUBLICATIONS

Patent Abstracts of Japan, vol. 007, No. 085 (M–206), Apr. 8, 1983, JP 58 011397 A, Kanai Takeshi, entitled "Total Heat Exchange Element".

* cited by examiner

*Primary Examiner*—Jose Fortuna
(74) *Attorney, Agent, or Firm*—Webb Ziesenheim Logsdon Orkin & Hanson, P.C.

(57) ABSTRACT

Producing high temperature-resistant technical paper, wherein fibers are mixed with a wet paper material pulp and then technical paper is produced from the pulp by the removal of water from the pulp and resulting compacting of the paper material, it is proposed that the fibers added to the wet pulp are fibers which have been cut and previously thermally pre-shrunk so that in practical use under high temperature conditions the finished technical paper experiences a low degree of thermal shrinkage of less than 1%.

5 Claims, No Drawings

METHOD FOR PRODUCING HIGH-TEMPERATURE RESISTANT TECHNICAL PAPER AND PAPER PRODUCED ACCORDING TO SAID METHOD

BACKGROUND

The invention concerns a process for producing high temperature-resistant technical paper, in which fibers serving as reinforcing elements are mixed with a wet paper material pulp and then technical paper is produced from the pulp by the removal of water from the pulp and resulting compacting of the paper material. In addition the invention concerns a high temperature-resistant technical paper which is produced in particular in accordance with that process.

High temperature-resistant technical papers are produced for example in thicknesses or sizes of between 0.5 and 5 mm. The production of high temperature-resistant technical papers is similar to the production of conventional papers, that is to say the technical papers, like other papers, are produced from a wet paper material pulp by the removal of water from the pulp and compacting which occurs as a result of the fibrous paper material.

It is known to produce high temperature-resistant papers for technical purposes, which contain ceramic fibers as reinforcing means. Ceramic papers of that kind which are used for thermal insulation purposes at up to 1,000° C. however suffer from the disadvantage that under operating conditions they suffer from comparatively severe shrinkage, more specifically for example between 2 and 4%. In addition those known ceramic papers involve the problem that the ceramic fibers which are used for same are not of a defined diameter but the diameter is generally below 3 $\mu$m so that the fibers of those ceramic papers can pass into the lungs and are considered to be a cause for concern in regard to health.

The object of the present invention is to provide a high temperature-resistant technical paper which can be used for example for thermal insulating purposes and which enjoys improved stability in respect of shape so that it does not experience unfavorable changes in practical operation and in particular its configuration and dimensions do not undesirably alter.

SUMMARY OF THE INVENTION

Briefly, according to this invention, there is provided a process for producing high temperature-resistant technical paper, in which fibers are mixed with a wet paper material pulp and then technical paper is produced from the pulp by the removal of water from the pulp and resulting compacting of the paper material, characterised in that the fibers added to the wet pulp are fibers which have been cut and previously thermally shrunk. Preferably, the fibers added to the wet pulp are cut, thermally shrunk silica fibers which are mixed with the wet pulp prior to production of the technical paper. Preferably, the silica fibers comprise between 80 and 99.98% of $SiO_2$. Preferably, the technical papers have a density or weight in relation to surface area of between 10 and about 400 g/m² are produced.

Briefly, according to this invention, there is provided a high temperature-resistant technical paper characterised in that the paper contains thermally shrinkable fibers such as silica fibers which are thermally pre-shrunk prior to production of the paper. Preferably, the paper is between 0.5 and 5 mm in thickness. Preferably, the paper comprises silica fibers of a mean diameter of 6 $\mu$m and is produced in a wet process with organic binding agents, for example, an acrylate.

The features of the process according to the invention and also the paper according to the invention can read both onto the process and also onto the paper, that is to say the invention is not limited in any of its aspects to the claimed process or the paper as also claimed. On the contrary the invention is to be viewed in its entirety, irrespective of how the specific claims are formulated.

DESCRIPTION OF THE PREFERRED EMBODIMENTS

In accordance with the present invention, to produce high temperature-resistant technical papers, fibers which are firstly cut and then shrunk by heat treatment are added at the paper manufacturer to the wet paper material pulp from which there is produced a paper provided with organic binding agents such as for example acrylates.

The thermally pre-shrunk silica fibers which are used in accordance with the invention in the production of high temperature-resistant papers are of a mean diameter of 6 $\mu$m, that is to say they cannot pass into the lungs. That is not the case with the ceramic fibers which were previously used for such purposes, for high temperature-resistant ceramic papers, for those ceramic fibers are not of a defined diameter, but that diameter is generally below 3 $\mu$m. Fibers of that kind however can pass into the lungs and accordingly are considered as giving cause for concern in regard to health.

Known ceramic technical papers are used for thermal insulation purposes at up to 1,000° C. At temperatures of that kind the known ceramic papers shrink by between 2 and 4%. As in accordance with the present invention, in production of the technical papers, previously shrunk fibers and in particular silica fibers are added to the paper material, the technical paper produced in accordance with the invention has a thermally induced shrinkage of less than 1%.

A further advantage of technical papers containing pre-shrunk silica fibers is that they do not contain any shot components as they are produced in a continuous drawing process. These technical paper fibers are therefore highly vibration-resistant.

The silica fibers used in accordance with the invention are preferably of a chemical composition of between 80 and 99.98% $SiO_2$.

In addition technical papers produced in accordance with the invention and of the nature in accordance with the invention are preferably of a density of between 10 and about 400 g/m².

What is claimed is:

1. A process for producing high temperature-resistant technical paper, in which fibers are mixed with a wet paper material pulp and then technical paper is produced from the pulp by the removal of water from the pulp and resulting compacting of the paper material, wherein:

the fibers added to the wet pulp are fibers which have been produced by a continuous drawing process, cut and previously thermally shrunk;

the fibers are silica fibers comprising between 80 and 99.98% of $SiO_2$ and having a mean diameter of at least 6 $\mu$m; and an effective amount of an acrylate organic binding agent is added to the pulp.

2. A process as set forth in claim 1 characterised in that technical papers of a density or weight in relation to surface area of between 10 and about 400 g/m² are produced.

3. High temperature-resistant technical paper characterised in that the paper contains thermally shrinkable fibers which are thermally pre-shrunk prior to production of the paper, wherein:

the fibers are silica fibers comprising between 80 and 99.98% of $SiO_2$ and having a mean diameter of at least 6 μm; and the paper comprises an effective amount of an acrylate organic binding agent.

4. A paper as set forth in claim 3 characterised in that it is between 0.5 and 5 mm in thickness.

5. A paper as set forth in claim 4 characterised in that it is produced in a wet process.

* * * * *